United States Patent
Barth et al.

(10) Patent No.: US 8,244,950 B2
(45) Date of Patent: Aug. 14, 2012

(54) BUFFERING NON-POSTED READ COMMANDS AND RESPONSES

(75) Inventors: Frank Barth, Radebeul (DE); Larry Hewitt, Austin, TX (US); Joerg Winkler, Ullersdorf (DE); Paul Miranda, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 2646 days.

(21) Appl. No.: 10/285,931

(22) Filed: Nov. 1, 2002

(65) Prior Publication Data

US 2004/0024947 A1 Feb. 5, 2004

(30) Foreign Application Priority Data

Jul. 31, 2002 (DE) .................................. 102 34 933

(51) Int. Cl.
*G06F 3/00* (2006.01)
*G06F 5/00* (2006.01)
*G06F 13/36* (2006.01)

(52) U.S. Cl. ........................... 710/306; 710/52; 710/310

(58) Field of Classification Search .................. 710/306, 710/310, 52
See application file for complete search history.

(56) References Cited

U.S. PATENT DOCUMENTS

| 5,546,546 A * | 8/1996 | Bell et al. ........................ 710/112 |
| 5,590,292 A * | 12/1996 | Wooten et al. .................... 710/5 |
| 5,694,556 A * | 12/1997 | Neal et al. ...................... 710/310 |
| 5,768,548 A | 6/1998 | Young et al. |
| 5,790,941 A | 8/1998 | Peponides |
| 5,850,530 A * | 12/1998 | Chen et al. ...................... 710/113 |
| 5,938,739 A * | 8/1999 | Collins et al. ..................... 710/5 |
| 5,953,538 A * | 9/1999 | Duncan et al. .................... 710/22 |
| 6,035,362 A * | 3/2000 | Goodrum et al. ............... 710/310 |
| 6,052,513 A * | 4/2000 | MacLaren ...................... 710/114 |
| 6,085,274 A * | 7/2000 | Seeman ........................ 710/310 |
| 6,112,265 A * | 8/2000 | Harriman et al. ................ 710/40 |
| 6,157,976 A | 12/2000 | Tien et al. |
| 6,243,781 B1 * | 6/2001 | Gandhi et al. ................. 710/313 |
| 6,385,705 B1 * | 5/2002 | Keller et al. ................... 711/154 |
| 6,571,332 B1 * | 5/2003 | Miranda et al. ............... 712/245 |

(Continued)

FOREIGN PATENT DOCUMENTS

EP 0760136 11/2001

(Continued)

OTHER PUBLICATIONS

Sanders, P.; , "The BaBar trigger, readout and event gathering system," Nuclear Science, IEEE Transactions on , vol. 45, No. 4, pp. 1894-1897, Aug. 1998.*

(Continued)

*Primary Examiner* — Faisal M Zaman
(74) *Attorney, Agent, or Firm* — Meyertons, Hood, Kivlin, Kowert & Goetzel, P.C.

(57) ABSTRACT

An improved interface technique for use in a southbridge or I/O hub or in similar devices is provided where non-posted read requests are received from at least one requestor, and upstream commands based on these requests are transmitted. Response data is received in reply to commands that were previously transmitted, and responses are transmitted to the at least one requester based on the response data. A buffer unit is provided for storing command identification data that identifies commands that were already transmitted or that are still to be transmitted, and response availability data that specifies response data that has been received by the receive engine. The improvement may enable multiple outstanding read requests.

40 Claims, 5 Drawing Sheets

U.S. PATENT DOCUMENTS

| | | | |
|---|---|---|---|
| 6,754,751 B1 * | 6/2004 | Willke | 710/112 |
| 6,801,976 B2 * | 10/2004 | Creta et al. | 710/310 |
| 6,877,052 B1 * | 4/2005 | Osborne | 710/107 |
| 7,003,615 B2 * | 2/2006 | Chui et al. | 710/311 |
| 2002/0156946 A1 * | 10/2002 | Masters et al. | 710/33 |
| 2003/0212531 A1 * | 11/2003 | Kerr et al. | 702/188 |
| 2004/0024948 A1 | 2/2004 | Winkler et al. | |
| 2004/0107306 A1 | 6/2004 | Barth et al. | |

FOREIGN PATENT DOCUMENTS

| | | | |
|---|---|---|---|
| JP | 11308300 A * | 11/1999 | |
| JP | 2006155398 A * | 6/2006 | |
| JP | 2007242026 A * | 9/2007 | |
| JP | 2007249667 A * | 9/2007 | |
| JP | 2009157648 A * | 7/2009 | |
| WO | WO 9000284 A1 * | 1/1990 | |
| WO | 01/69859 | 9/2001 | |
| WO | WO 2009081593 A1 * | 7/2009 | |

OTHER PUBLICATIONS

Apostolidis, K.; Xing, X.H.; Merakos, L.; , "A protocol for voice and data integration in undirectional bus networks," Communications, 1990. ICC '90, Including Supercomm Technical Sessions. SUPERCOMM/ICC '90. Conference Record., IEEE International Conference on , pp. 279-283 vol. 2, Apr. 16-19, 1990.*

Angelopoulos, J.D.; Koulouris, J.; , "Control of ATM traffic accessing SuperPONs," Computers and Communications, 1997. Proceedings., Second IEEE Symposium on , pp. 584-588, Jul. 1-3, 1997.*

Gregg, T. A.; Errickson, R. K.; , "Coupling I/O channels for the IBM eServer z900: Reengineering required," IBM Journal of Research and Development , vol. 46, No. 4.5, pp. 461-474, Jul. 2002.*

English translation of Office Action with regard to patent application No. DE 10234933.9-53 mailed Feb. 4, 2004.

Translation of Official Communication, Application No. DE 102 340o933.39-53, mailed Jun. 7, 2005.

International search report application No. PCT/US2005/006113 mailed Jun. 9, 2005.

Written Opinion application No. PCT/US2005/006113.

Translation of Official Communication in German application No. 102 34 933.9-53 issued Apr. 20, 2007.

HyperTransport I/O Link Specification, Revision 1.03, Oct. 10, 2001, pp. 26 to 28, 46, 47 and 61 to 63.

Translation of Official Communication in application No. DE 102 34 933.9-53 issued May 15, 2008.

* cited by examiner

BUFFERING NON-POSTED READ COMMANDS AND RESPONSES

BACKGROUND OF THE INVENTION

1. Field of the Invention

The invention generally relates to integrated circuit chips and related devices and methods, and in particular to the handling of non-posted read requests in devices such as southbridges or I/O hubs.

2. Description of the Related Art

Integrated circuit chips are often used for data processing and are known to comprise a number of different circuit units. Generally, each circuit unit is for performing a specific function and of course, there may be different circuit units provided on one chip for performing the same function, or performing different functions. The circuit units may operate sequentially in time or simultaneously, and they may function independently from each other, or dependent on the operation of other circuit units.

In the latter case, the circuit units are usually interconnected via an interface to allow the circuit units to interchange data needed for making the operation of one circuit unit dependent on the operation of the other circuit unit. The data exchange is often done by sending transactions from one circuit unit to the other circuit unit. A transaction is a sequence of packets that are exchanged between the circuit units and that result in a transfer of information. The circuit unit initiating a transaction is called the source (or master), and the circuit unit that ultimately services the transaction on behalf of the source is called target. It is to be noted that there may also be intermediary units between the source and the target.

Transactions may be used to place a request, or to respond to a received request. Taking the requests, there may be distinguished posted request from non-posted requests, dependent on whether the request requires a response. Specifically, a non-posted request is a request that requires a response while a posted request does not require a response.

When focusing on the functions which are performed by the interconnected circuit units, the circuit units can often be divided into hosts and devices. The term host then means a circuit unit that provides services to the dependent device. A transaction from the host to the device is said to be downstream while a transaction in the other direction is said to be upstream. In bi-directional configurations, both the host and the device may send and receive requests and responses so that a device may be source as well as target, and also the host may function as source as well as device.

Figure 1:
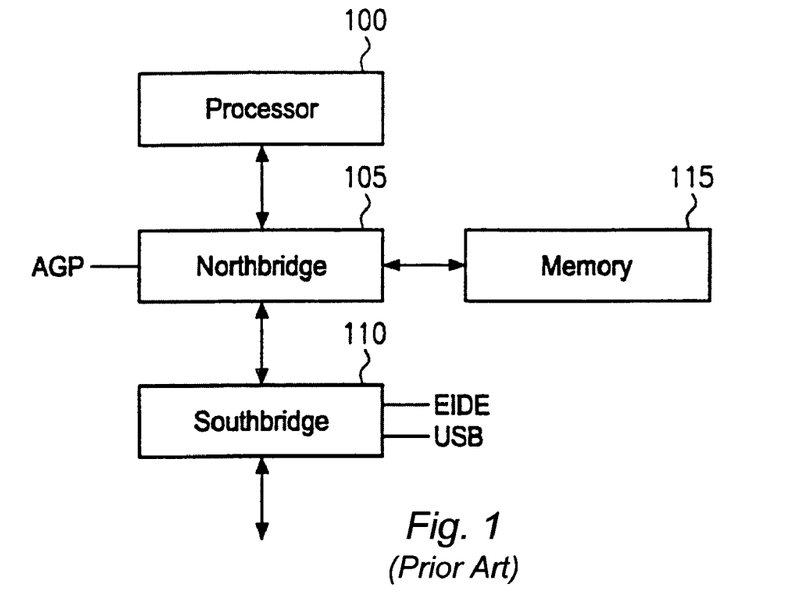
FIG. 1 is a block diagram illustrating schematically the hardware components of a conventional computer system.

A field where such integrated circuit chips are widely used are personal computers. Referring to FIG. 1, the hardware components of a common motherboard layout are depicted. It is to be noted that this figures shows only one example of a motherboard layout, and other configurations exist as well. The basic elements found on the motherboard of FIG. 1 may include the CPU (Central Processing Unit) 100, a northbridge 105, a southbridge 110, and system memory 115.

The northbridge 105 is usually a single chip in a core-logic chipset that connects the processor 100 to the system memory 115 and, e.g., to the AGP (Accelerated Graphic Port) and PCI (Peripheral Component Interface) buses. The PCI bus is commonly used in personal computers for providing a data path between the processor 100 and peripheral devices like video cards, sound cards, network interface cards and modems. The AGP bus is a high-speed graphic expansion bus that directly connects the display adapter and system memory 115. AGP operates independently of the PCI bus. It is to be noted that other motherboard layouts exist that have no northbridge in it, or that have a northbridge without AGP or PCI options.

The southbridge 110 is usually the chip in a system core-logic chipset that controls the IDE (Integrated Drive Electronics) or EIDE (Enhanced IDE) bus, controls a USB (Universal Serial Bus) bus that provides plug-and-play support, controls a PCI-ISA (Industry Standard Architecture) bridge, manages the keyboard/mouse controller, provides power management features, and controls other peripherals.

Thus, common personal computers include southbridges 110 which are integrated circuit chips substantially as described above. Conventionally, the southbridge 110 and the northbridge 105 are interconnected by the PCI bus acting as system bus so that the northbridge 105 works as host-to-PCI bridge forming a link between the host bus that connects to the processor 100, and the PCI bus whereas the southbridge 110 works as, e.g., PCI-to-ISA bus where the ISA (Industry Standard Architecture) bus is the I/O bus. However, other chipset arrangements exist in which the northbridge 105 operates as memory controller hub and the southbridge 110 as I/O controller hub. In such structures, the northbridge 105 and the southbridge 110 are no longer interconnected by a system bus but by a specific hub interface.

To satisfy the demands for high-speed chip-to-chip communication in such hub interfaces, the HyperTransport™ technology was developed which provides a high-speed, high-performance point-to-point on-board link for interconnecting integrated circuits on a motherboard. It can be significantly faster than a PCI bus for an equivalent number of pins. The HyperTransport technology is designed to provide significantly more bandwidth than current technologies, to use low-latency responses, to provide low pin count, to be compatible with legacy computer buses, to be extensible to new system network architecture buses, to be transparent to operating systems, and to offer little impact on peripheral drivers.

Figure 2:
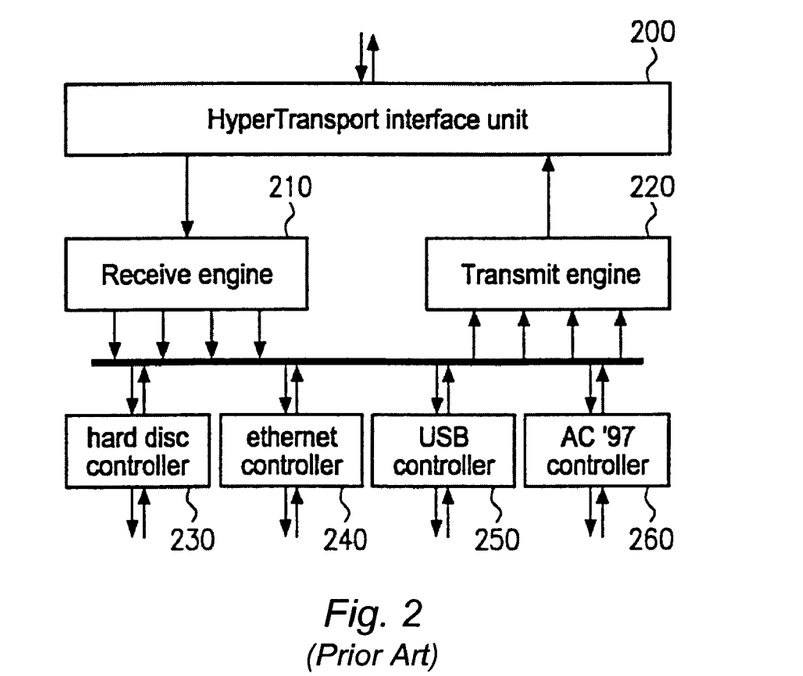
FIG. 2 illustrates the components of a conventional southbridge or I/O hub.

The hardware components of a HyperTransport compliant southbridge device (or I/O hub) is depicted in FIG. 2. A number of bus masters 230-260 are provided for controlling peripheral system components. The controllers include a hard disk controller 230, an ethernet controller 240, a USB (Universal Serial Bus) controller 250, and an AC (Audio Codec) '97 controller 260. These controllers act as bus masters to interact with a transmit engine 220 and a receive engine 210 of the device. The transmit engine 220 receives requests from the controllers 230-260 and performs an arbitration to select at any one time one of the requestors 230-260. Based on the received requests, the transmit engine 220 sends commands to the HyperTransport interface unit 200 that interfaces to a HyperTransport compliant link. Received responses are supplied from the HyperTransport interface unit 200 to the receive engine 210 where the responses are forwarded to the respective controllers 230-260 that were the originators of the requests.

Thus, the HyperTransport interface is a split transaction interface, i.e., requests and responses are transferred on the bus as completely decoupled and independent transactions. All HyperTransport I/O devices must be able to accept responses out of order or restrict themselves to one outstanding non-posted request. A bridge that is between a HyperTransport technology device and an I/O protocol that requires responses to be returned in order must provide sufficient buffering to be able to reorder as many responses as it may have outstanding requests.

Thus, the HyperTransport technology supports multiple outstanding read requests and requires in such cases to buffer responses. However, the HyperTransport specification does not contain more detailed definitions with respect to the hardware implementation for realizing this function. It has been found that providing nothing more than just a buffer for returned responses may still impose limitations with respect to the data throughput and thus, the overall system performance.

Figure 3:
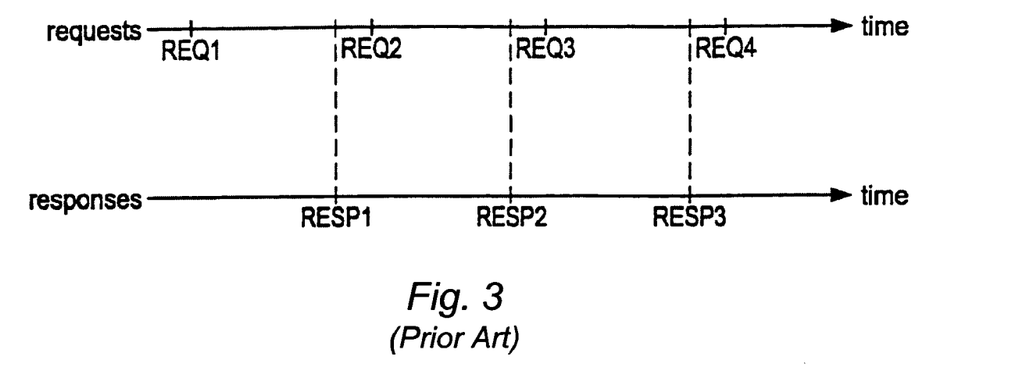
FIG. 3 is a timing chart illustrating the transmission and reception time of requests and responses in a conventional system where multiple outstanding requests are not supported.

If, however, the device of FIG. 2 is configured not to support multiple outstanding requests, the entire device may be blocked once a request is placed until the respective response is received and delivered. This is illustrated in FIG. 3 where at any one time only one request is active. This significantly reduces the data throughput since no data traffic takes place if a request is placed but a response is not yet available.

SUMMARY OF THE INVENTION

An improved interface buffering technique for use in southbridges, I/O hubs or the like is provided that may improve the overall system performance, in particular when using a high-speed interface technology such as the HyperTransport technology.

In one embodiment, a southbridge device is provided that comprises a transmit engine that is adapted to receive non-posted read requests from at least one requester, and transmit upstream commands based on the non-posted read requests. The southbridge device further comprises a receive engine that is adapted to receive response data in reply to commands previously transmitted by the transmit engine, and transmit responses to the at least one requestor based on the response data. Moreover, the southbridge device comprises a buffer unit that is connected to the transmit engine and the receive engine. The buffer unit is adapted to store command identification data identifying commands transmitted or to be transmitted by the transmit engine, and response availability data specifying response data that has been received by the receive engine.

In another embodiment, there may be provided an integrated circuit chip that comprises a transmit circuit that is adapted to receive non-posted read requests from at least one requestor, and transmit upstream commands based on the non-posted read requests. The integrated circuit chip further comprises a receive circuit adapted to receive response data in reply to commands previously transmitted by the transmit circuit, and transmit responses to the at least one requestor based on the response data. Moreover, the integrated circuit chip comprises a buffer unit that is connected to the transmit circuit and the receive circuit. The buffer unit is adapted to store command identification data identifying commands transmitted or to be transmitted by the transmit circuit, and response availability data specifying response data that has been received by the receive circuit.

In still another embodiment, a computer system may be provided that comprises at least one peripheral component and a southbridge. The southbridge comprises a transmit engine that is adapted to receive non-posted read requests from at least one peripheral component controller, and transmit upstream commands based on the non-posted read requests. The southbridge further comprises a receive engine that is adapted to receive response data in reply to commands previously transmitted by the transmit engine, and transmit responses to the at least one peripheral component controller based on the response data. The southbridge further comprises a buffer unit that is connected to the transmit engine and the receive engine. The buffer unit is adapted to store command identification data identifying commands transmitted or to be transmitted by the transmit engine, and response availability data specifying response data that has been received by the receive engine.

According to a further embodiment, a method of operating a southbridge device comprises receiving non-posted read requests from at least one requester, transmitting upstream commands based on the non-posted read requests, receiving response data in reply to previously transmitted commands, and transmitting responses to the at least one requestor based on the response data. The method further comprises storing command identification data identifying transmitted or to be transmitted commands, and storing response availability data specifying received response data.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 4:
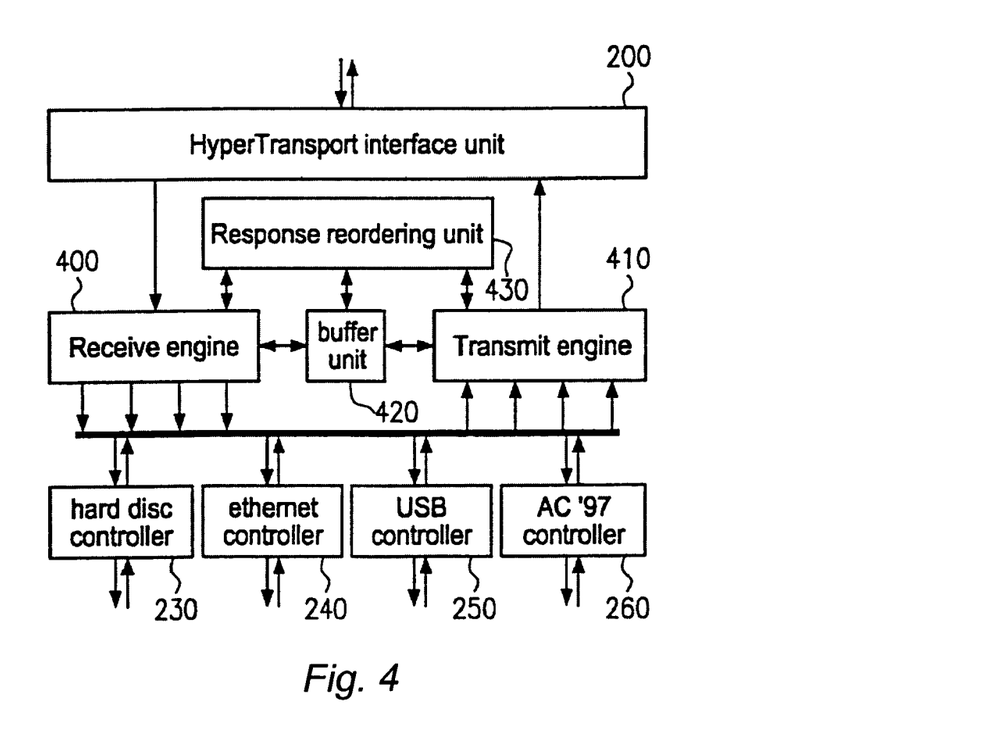
FIG. 4 illustrates the components of a southbridge device or I/O hub according to an embodiment.

Referring now to the drawings and in particular to FIG. 4, the hardware components of a southbridge device such as an I/O hub according to an embodiment is depicted. Comparing the arrangement of FIG. 4 with that of FIG. 2, a buffer unit 420 is provided that is connected to the transmit engine 410 and the receive engine 400. Further, the device comprises a response reordering unit 430 that is connected to the transmit engine 410, the receive engine 400, and the buffer unit 420. The function of these units will be explained below in more detail.

In the present embodiment, the buffer unit 420 that is connected to the transmit engine 410 and the receive engine 400 is adapted to store command identification data that identifies commands transmitted or to be transmitted by the transmit engine 410, and response availability data that specifies response data that has been received by the receive engine 400. The buffer unit 420 of the present embodiment is depicted in more detail in the block diagram of FIG. 5.

Figure 5:
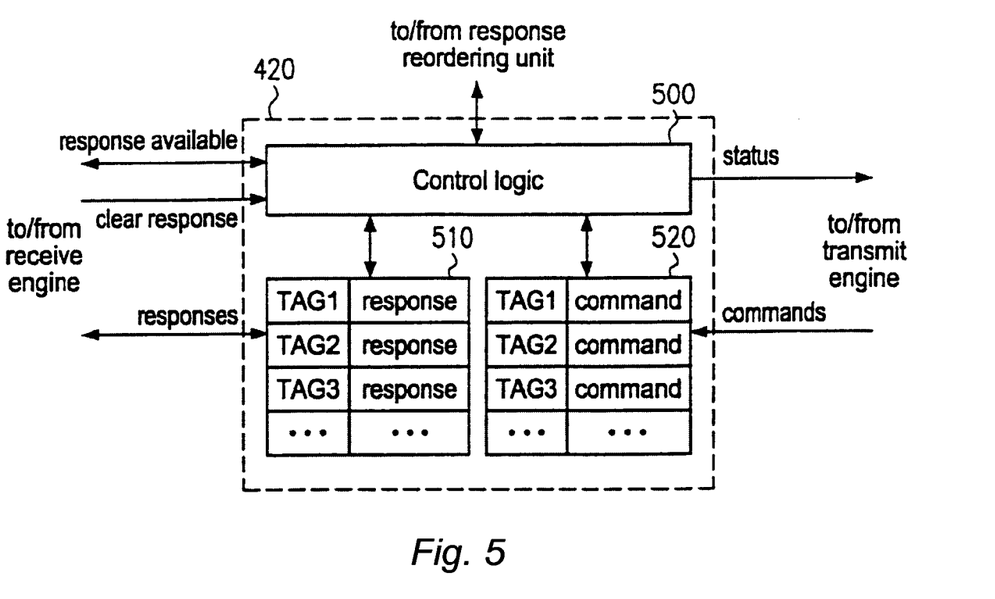
FIG. 5 illustrates the buffer unit that is a component of the arrangement of FIG. 4, in more detail.

As apparent from this figure, the buffer unit 420 comprises a response buffer 510 and a command buffer 520. Both buffers are connected to a control logic 500 for receiving control signals therefrom. The control logic 500 may issue status information to the transmit engine 410, and a response-available signal to the receive engine 400. Further, the control logic 500 may receive a clear-response signal from the receive engine 400. Moreover, the control logic 500 may be connected to the response reordering unit 430.

The response buffer 510 may comprise a plurality of buffer elements that are each uniquely assigned to a command tag. Command tags are data items used to uniquely identify upstream commands. Command tags may be transaction tags as specified in the HyperTransport specification, used to uniquely identify all transactions in progress that were initiated by a single requestor. There may be a predefined number of possible values that the command tags may assume. For instance, the commands may be tagged by eight different tag values. In this case, there will be eight buffer elements in the response buffer 510 to store respective responses.

As apparent from the figure, each buffer element may comprise a tag field for storing the tag, and a response field for storing the response. It is however to be noted that in another embodiment, the tag field may be dropped. In this case, the tags are used to address the buffer element.

It is further to be noted that the response buffer 510 of the present embodiment stores the response data in the form this data was received by the receive engine 400 from the HyperTransport interface unit 200. In another embodiment, the response buffer 510 may store responses in the form in which they are delivered from the receive engine 400 to the respective peripheral component controller 230-260.

Both kinds of response data can be understood as being response availability data since it specifies response data that has been received by the receive engine 400. In another embodiment, the response buffer 510 may store response availability data that differs from the responses themselves. For instance, the response availability data may comprise pointers to responses, or addresses.

The command buffer 520 of the buffer unit 420 may store commands in much the same way as the response buffer 510 stores responses. The commands stored in the command buffer 520 may be commands that were already transmitted by the transmit engine 410. In another embodiment, the buffered commands are commands that are still to be transmitted by the transmit engine 410. The command buffer 520 may also store both, commands that were already transmitted as well as commands that are still to be transmitted. In a further embodiment, the command buffer 520 may store command identification data that is different from the commands themselves, but identifies the commands.

Figure 6:
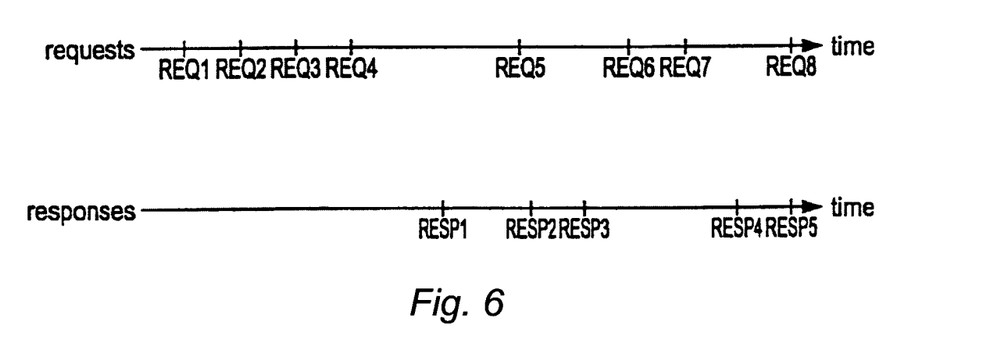
FIG. 6 is a timing chart illustrating the transmission and reception time of requests and responses according to an embodiment.

By means of the buffer unit 420, the southbridge device or I/O hub allows the bus masters 230-260 to start more than one outstanding read request, i.e. to start further requests although a previously placed request has not yet been answered by an appropriate response. This can be seen from FIG. 6 which is a timing chart similar to that of FIG. 3, illustrating the capability of placing multiple outstanding requests. In the example of FIG. 6, four requests are placed closely together in time. The second, third and fourth requests are placed although the first request has not yet been served. After a given time, the response to the first request is received. Before the second response is received, a fifth request is placed in the example of FIG. 6. The sequence of requests and responses in the example of FIG. 6 continues with a second and third response, a sixth and seventh request, and so on.

Thus, requests may be placed irrespective of whether responses to previously transmitted requests are available. Moreover, requests can be placed in the form of bursts. A burst is a sequence of requests that are uniquely identified by subsequent command tags. In the example of FIG. 6, the first to fourth requests form such a burst.

Figure 7:
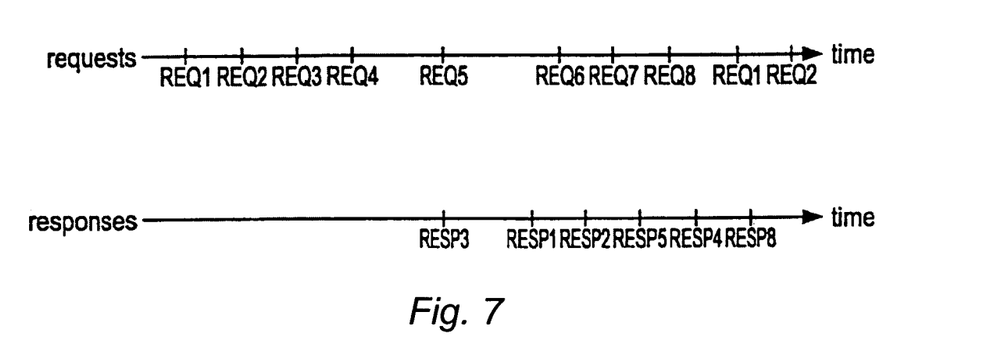
FIG. 7 is a timing chart similar to that of FIG. 6 but concerning the case where responses are reordered.

Turning now to FIG. 7, another timing chart is provided giving an example of the placement of multiple outstanding requests where the responses are received out of order. After a burst of four requests are placed, a response to the third request in the burst is received. That is, the responses to the first and second requests are received later than the response to the third request. Moreover, it can be seen that responses to requests that are not contained in the burst may arrive earlier than the latest response that pertains to the burst. In the example of FIG. 7, the fifth response is a response to a request that is not part of the burst, but it is received earlier than the fourth response that does pertain to the burst.

Figure 8:
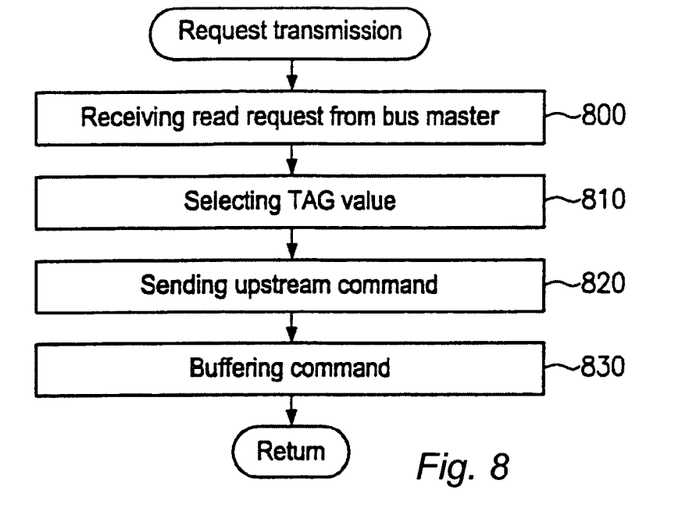
FIG. 8 is a flowchart illustrating the request transmission process according to an embodiment.

The process of placing requests will now be described with reference to FIG. 8. This figure shows a flowchart beginning with step 800 of receiving a read request from one of the bus masters 230-260. The transmit engine 410 that upstream command in step 820 based on the received read request to the HyperTransport interface unit 200. The transmit engine 410 then buffers the command or any suitable command identification data into the command buffer 520 in step 830.

Figure 9:
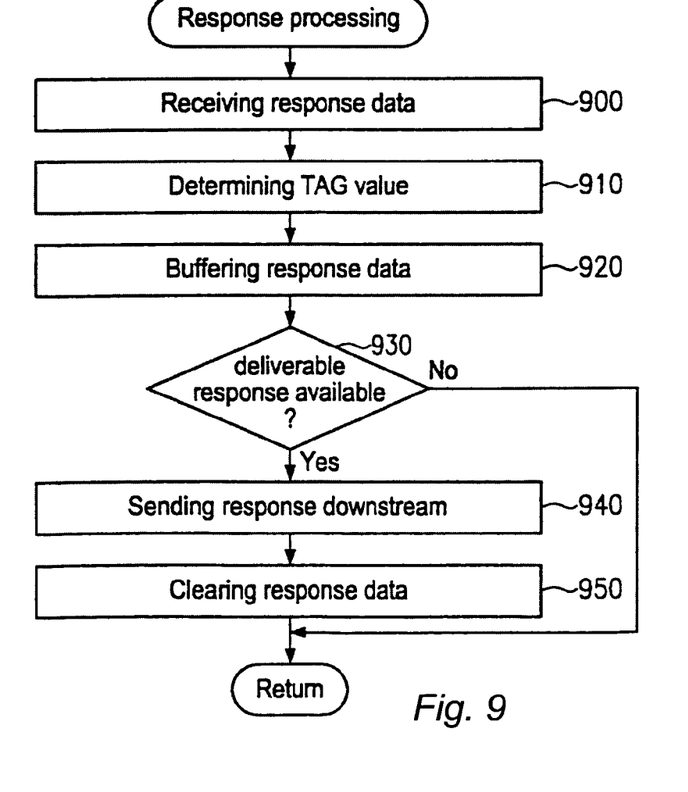
FIG. 9 is a flowchart illustrating the processing of responses according to an embodiment.

FIG. 9 is a flowchart illustrating the steps performed in processing received responses. In step 900, the receive engine 400 receives response data from the HyperTransport interface unit 200. The receive engine 400 then determines the corresponding tag value in step 910 and buffers the response data in the response buffer 510 in step 920. As mentioned above, the receive engine 400 may store the response in other formats, or may even store any other kind of response availability data in the buffer 510.

The receive engine 400 may then determine in step 930 whether a deliverable response is available. Although step 930 is depicted in the flowchart of FIG. 9 as being performed after step 920, it is to be noted that the process flow of steps 930 to 950 may be performed completely independently therefrom, even in parallel to steps 900 to 920.

If a deliverable response has been determined as being available, using the response availability data in the response buffer 510, the receive engine 400 sends a corresponding response downstream to the respective bus master 230-260 in step 940, and clears in step 950 the response availability data in the buffer 510.

For performing the steps 930 to 950, the receive engine 400 may interchange signals with the control logic 500 of the buffer unit 420, such as the above mentioned response-available signal and the clear-response signal.

Figure 10:
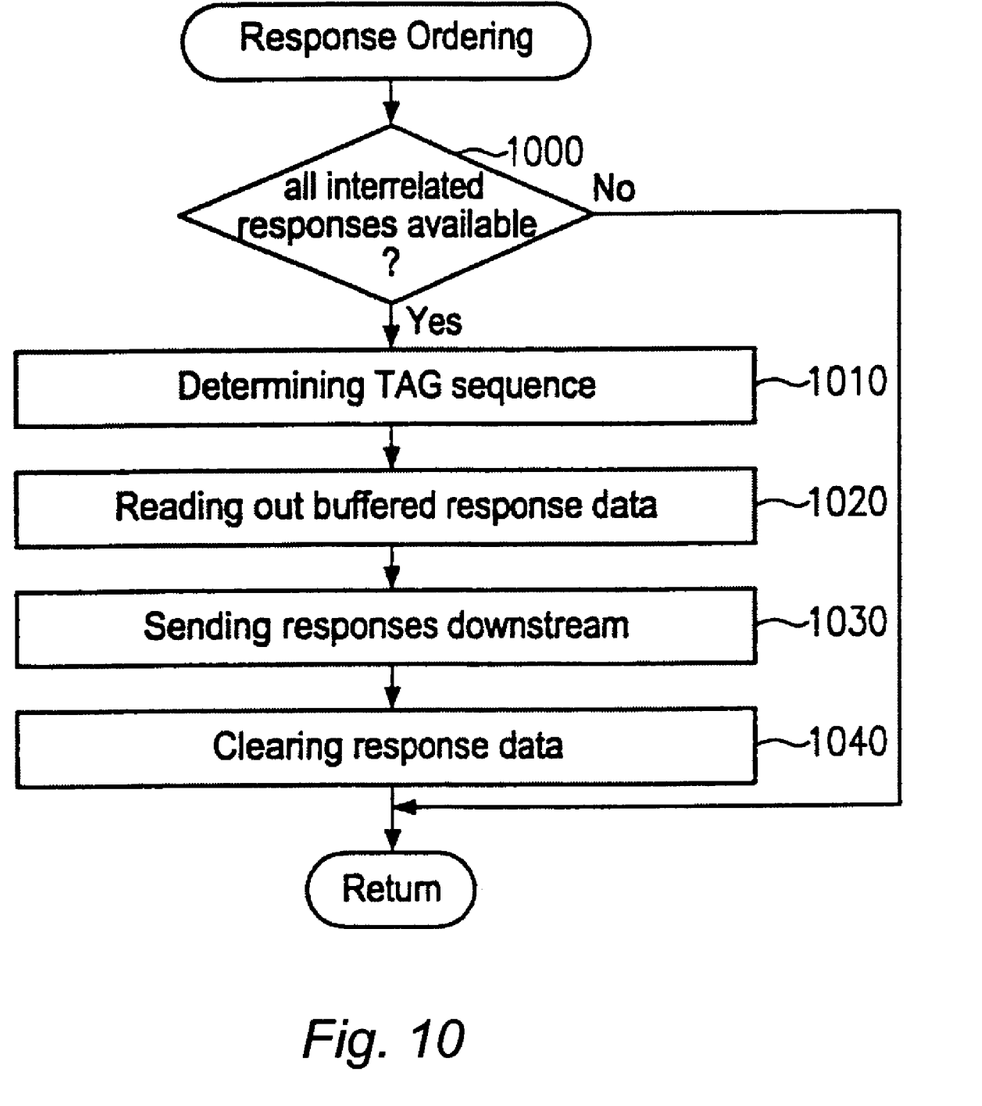
FIG. 10 is a flowchart illustrating the response ordering process according to an embodiment.

Turning now to FIG. 10, the depicted flowchart illustrates the process of bringing the received responses in order. As discussed above with reference to FIG. 7, responses to placed requests may arrive out of order. Using the buffer unit 420 and the response reordering unit 430, the device of FIG. 4 is provided with a response reordering mechanism that is adapted to control the receive engine 400 to transmit the responses in the correct order. Response reordering according to the present embodiment may make use of the fact that the buffer unit 420 comprises a plurality of buffer elements that are each uniquely assigned to one of the command tags.

In step 1000, the receive engine 400 checks whether all interrelated responses are available. Interrelated responses may be a response to a memory read request where more than sixteen double words are requested from memory. The maximum number of requested read data for one read command is limited by the HyperTransport protocol to sixteen double words, i.e. 32 bits. That is, if more data is requested than 32 bits, a burst of read commands needs to be placed. Responses pertaining to requests in one and the same burst may be understood as being interrelated responses.

If the receive engine 400 determines in step 1000 that all interrelated responses to a given read request are available, it determines the sequence of command tag values in step 1010 for reading the corresponding response data out of the response buffer 510 in step 1020. The responses are then sent downstream in step 1030, and the buffered response data is cleared (step 1040).

As apparent from the foregoing description of the various embodiments, a significant performance improvement may be achieved by adding a buffer for outstanding non-posted commands to use the split transaction capability of the HyperTransport technology. This removes the limitation with respect to the data throughput, thus improving the peripheral controller performance.

In particular when serving requests from one bus master 230-260, the overall performance may be improved for longer bursts. If more than one bus master has access to the transmit engine 410, the performance of all bus master request handling can be improved. Using multiple buffer elements as discussed above, sustained bursts are made possible even for longer latencies between the start of a command and the availability of the respective response. For one bus master 230-260, more than one read request may be started, thus enabling a prefetching mechanism.

Moreover, as discussed above, the buffer unit 420 is adapted to store command identification data identifying commands transmitted or to be transmitted by the transmit engine 410. The command identification data may include the identified commands. Further, the buffer unit 420 may store command identification data that identifies plural commands that each relate to the same requester. The transmit engine 410 may be capable of transmitting upstream commands based on plural non-posted read requests from one requestor, irrespective of the availability of responses to the requests. Alternatively, the buffer unit 420 may be arranged to store command identification data that identifies plural commands that each relate to different requesters. In the above embodiments, the non-posted read requests may be memory read requests.

Moreover, the transmit engine 410 may be adapted to receive non-posted read requests from two or more requesters. The transmit engine will then arbitrate between the requesters when transmitting the upstream commands.

The command identification data may be written by the transmit engine 410 into the buffer unit 420 when receiving the non-posted read requests, or when transmitting the upstream commands. Further, the receive engine 400 may be adapted to generate the response availability data and write the generated response availability data into the buffer unit 420 when receiving the response data.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A southbridge device comprising:
   a transmit engine adapted to receive non-posted read requests from at least one requestor, and transmit upstream commands corresponding to said non-posted read requests in the order in which said non-posted read requests were received;
   a receive engine adapted to receive response data in reply to commands previously transmitted by said transmit engine, and transmit responses to said at least one requestor based on said response data; and
   a buffer unit connected to said transmit engine and said receive engine, said buffer unit being adapted to store command identification data identifying commands transmitted or to be transmitted by said transmit engine, and response availability data specifying response data that has been received by said receive engine;
   wherein said transmit engine is adapted to write said command identification data into said buffer unit responsive to having transmitted said upstream commands.

2. The southbridge device of claim 1, wherein said command identification data includes said identified commands transmitted or to be transmitted by said transmit engine.

3. The southbridge device of claim 1, wherein said buffer unit is arranged to store command identification data identifying plural commands each relating to the same requestor.

4. The southbridge device of claim 1, wherein said transmit engine is capable of transmitting upstream commands based on plural non-posted read requests from one requestor, irrespective of the availability of responses to said requests.

5. The southbridge device of claim 4, wherein said transmit engine is capable of transmitting said upstream commands based on bursts of non-posted read requests.

6. The southbridge device of claim 1, wherein said buffer unit is arranged to store command identification data identifying plural commands each relating to different requestors.

7. The southbridge device of claim 1, wherein said non-posted read requests are memory read requests.

8. The southbridge device of claim 1, further comprising:
   an interface unit connected to said transmit engine and said receive engine for transmitting said upstream commands and receiving said response data via a data link that supports split transactions.

9. The southbridge device of claim 8, wherein said data link that supports split transactions is a HyperTransport compliant data link.

10. The southbridge device of claim 1, comprising said at least one requestor.

11. The southbridge device of claim 1, wherein said at least one requestor is a hard disc controller.

12. The southbridge device of claim 1, wherein said at least one requestor is an ethernet controller.

13. The southbridge device of claim 1, wherein said at least one requestor is a USB (Universal Serial Bus) controller.

14. The southbridge device of claim 1, wherein said at least one requestor is an audio codec controller.

15. The southbridge device of claim 1, wherein said transmit engine is adapted to receive non-posted read requests from at least two requestors, and wherein said transmit engine is adapted to arbitrate between said at least two requestors when transmitting said upstream commands.

16. The southbridge device of claim 1, wherein said transmit engine is adapted to write said command identification data into said buffer unit when receiving said non-posted read requests.

17. The southbridge device of claim 1, wherein said receive engine is adapted to generate said response availability data and write the generated response availability data into said buffer unit when receiving said response data.

18. The southbridge device of claim 1, wherein said receive engine is adapted to clear response availability data in said buffer unit when transmitting respective responses.

19. The southbridge device of claim 1, being an I/O (Input/Output) hub.

20. An integrated circuit chip comprising:
a transmit circuit adapted to receive non-posted read requests from at least one requestor, and transmit upstream commands corresponding to said non-posted read requests in the order in which said non-posted read requests were received;
a receive circuit adapted to receive response data in reply to commands previously transmitted by said transmit circuit, and transmit responses to said at least one requestor based on said response data; and
a buffer unit connected to said transmit circuit and said receive circuit, said buffer unit being adapted to store command identification data identifying commands transmitted or to be transmitted by said transmit circuit, and response availability data specifying response data that has been received by said receive circuit;
wherein said transmit circuit is adapted to write said command identification data into said buffer unit responsive to having transmitted said upstream commands.

21. A computer system comprising:
at least one peripheral component; and
a southbridge comprising a transmit engine adapted to receive non-posted read requests from at least one peripheral component controller, and transmit upstream commands corresponding to said non-posted read requests in the order in which said non-posted read requests were received; and a receive engine adapted to receive response data in reply to commands previously transmitted by said transmit engine, and transmit responses to said at least one peripheral component controller based on said response data;
wherein said southbridge further comprises a buffer unit connected to said transmit engine and said receive engine, said buffer unit being adapted to store command identification data identifying commands transmitted or to be transmitted by said transmit engine, and response availability data specifying response data that has been received by said receive engine; and
wherein said transmit engine is adapted to write said command identification data into said buffer unit responsive to having transmitted said upstream commands.

22. A method of operating a southbridge device, the method comprising:
receiving non-posted read requests from at least one requestor;
transmitting upstream commands corresponding to said non-posted read requests in the order in which said non-posted read requests were received;
receiving response data in reply to previously transmitted commands; and
transmitting responses to said at least one requestor based on said response data, wherein the method further comprises:
storing command identification data identifying transmitted or to be transmitted commands;
storing response availability data specifying received response data; and
writing said command identification data into a buffer responsive to transmitting said upstream commands.

23. The method of claim 22, wherein said command identification data includes said identified transmitted or to be transmitted commands.

24. The method of claim 22, wherein said command identification data identifies plural commands each relating to the same requestor.

25. The method of claim 22, wherein said upstream commands are transmitted based on plural non-posted read requests from one requestor, irrespective of the availability of responses to said requests.

26. The method of claim 25, wherein said upstream commands are transmitted based on bursts of non-posted read requests.

27. The method of claim 22, wherein said command identification data identifies plural commands each relating to different requestors.

28. The method of claim 22, wherein said non-posted read requests are memory read requests.

29. The method of claim 22, wherein transmission of said upstream commands and reception of said response data are performed via a data link that supports split transactions.

30. The method of claim 29, wherein said data link that supports split transactions is a HyperTransport compliant data link.

31. The method of claim 22, wherein reception of said non-posted read requests and transmission of said responses are performed from and to requestors incorporated in said southbridge device.

32. The method of claim 22, wherein said at least one requestor is a hard disc controller.

33. The method of claim 22, wherein said at least one requestor is an ethernet controller.

34. The method of claim 22, wherein said at least one requestor is a USB (Universal Serial Bus) controller.

35. The method of claim 22, wherein said at least one requestor is an audio codec controller.

36. The method of claim 22, wherein said non-posted read requests are received from at least two requestors, and the method further comprises:
arbitrating between said at least two requestors when transmitting said upstream commands.

37. The method of claim 22, further comprising:
writing said command identification data into said buffer when receiving said non-posted read requests.

38. The method of claim 22, further comprising:
generating said response availability data; and
writing the generated response availability data into said buffer when receiving said response data.

39. The method of claim 22, further comprising:
clearing response availability data when transmitting respective responses.

40. The method of claim 22, for operating an I/O (Input/Output) hub.

* * * * *